United States Patent
Gales et al.

[11] Patent Number: 5,967,728
[45] Date of Patent: Oct. 19, 1999

[54] PRECISION PLACEMENT STORAGE AND RETRIEVAL SYSTEM

[75] Inventors: Charles C. Gales; Mark A. Killian, both of Lancaster; Colin T. McShane, Oxford; Richard T. Nornhold, Jr., Ephrata, all of Pa.

[73] Assignee: Emtrol, Inc., Lancaster, Pa.

[21] Appl. No.: 08/978,835

[22] Filed: Nov. 26, 1997

[51] Int. Cl.[6] .................................................. B65G 1/02
[52] U.S. Cl. .......................... 414/284; 211/151; 211/186; 238/122; 238/136
[58] Field of Search ................................. 414/341, 347, 414/267, 279, 284, 495; 254/92, 98; 211/151, 186, 187; 238/122, 127, 128, 136, 140

[56] References Cited

U.S. PATENT DOCUMENTS

| | | | |
|---|---|---|---|
| 321,414 | 7/1885 | Barnes | 238/134 |
| 1,102,232 | 7/1914 | Benedict | 254/92 X |
| 1,402,257 | 1/1922 | Shea | 254/92 |
| 1,561,753 | 11/1925 | Swanner | 254/92 |
| 1,942,022 | 1/1934 | Faries | 414/341 X |
| 2,523,880 | 9/1950 | Schoenfielder | 254/92 |
| 3,313,429 | 4/1967 | Cole | 414/347 X |
| 4,273,494 | 6/1981 | Swain et al. | 414/284 X |
| 4,286,911 | 9/1981 | Benjamin | 414/284 X |
| 4,568,233 | 2/1986 | Baker et al. | 414/267 |
| 4,640,459 | 2/1987 | Hetemaa et al. | 238/122 |
| 4,965,940 | 10/1990 | Wilson | 238/122 X |
| 4,971,508 | 11/1990 | Miyahara et al. | 414/341 X |
| 5,054,986 | 10/1991 | Hirano et al. | 414/341 X |
| 5,056,170 | 10/1991 | Kronshagen | 254/92 |
| 5,129,601 | 7/1992 | Henkel | 254/98 |
| 5,170,897 | 12/1992 | Wentworth | 211/186 X |
| 5,172,442 | 12/1992 | Bartley et al. | 254/92 |
| 5,193,662 | 3/1993 | McCulloch et al. | 198/774.1 |
| 5,286,157 | 2/1994 | Vainio et al. | 414/279 X |
| 5,370,492 | 12/1994 | Gleyze et al. | 414/279 |
| 5,388,955 | 2/1995 | Schröder | 414/267 X |
| 5,445,280 | 8/1995 | Rahn | 211/186 |
| 5,449,062 | 9/1995 | McTaggart | 198/774.3 |

OTHER PUBLICATIONS

Emtrol brochure: Automated Bakery Pan & Trough Storage and Retrieval, undated.
Emtrol brochure: Take Control With Emtrol, Automated Pan and Trough Storage Retrieval Systems.

*Primary Examiner*—David A. Bucci
*Attorney, Agent, or Firm*—Dan Williams

[57] ABSTRACT

A rail system and transfer vehicle for a storage retrieval system. The rails are fabricated to include a vehicle support surface that supports a transfer vehicle, a load support surface that supports the skid, tote, vessel, or pallet to be stored, a spacing surface that defines the distance between the load support surface and the vehicle support surface. Attached to the load support surface is an alignment surface that extends upwardly at an angle between 40 and 80 from the horizontal. When a misaligned pallet is lowered, it first contacts the alignment surface and as it continues to be lowered, interaction between the alignment surface and the misaligned pallet causes the pallet to move into alignment with the rail system before coming to rest on the load support surface. The rail system can be used in conjunction with a high weight capacity transfer vehicle. Load lift is provided by a plurality of interconnected screw jacks. The screw jacks can be raised, lowered, and precisely controlled by an inverter duty AC gear motor connected to the jacks by a sprocket/chain system.

21 Claims, 7 Drawing Sheets

PRECISION PLACEMENT STORAGE AND RETRIEVAL SYSTEM

BACKGROUND

1. Field of the Invention

The present invention relates to transfer vehicles and support systems used to transfer pallets, totes, skids and the like within a defined storage retrieval system. More particularly, the present invention relates to a system that allows precision movement, placement and replacement of both light and heavy loads in a storage retrieval system.

2. Description of the Related Art

Automated storage retrieval systems are used to retrieve and place loaded and unloaded pallets, totes, skids and the like within a predesigned storage layout. Use of such automated storage retrieval systems reduces materials handling costs by reducing personnel costs and storage floor area while simultaneously increasing flexibility within the system.

For example, in the bakery industry dough is allowed to ferment for specified times in troughs. Stackers and unstackers are used to store and retrieve the troughs in multilevel systems that decrease the floor area needed to handle a given capacity line. Such a system may include a shuttle vehicle and an on board transfer vehicle to provide random access to troughs. The storage retrieval system may be part of a larger system that transports, greases, weighs, degasses and dumps the troughs.

Other types of industrial processes may also require batch processing. For example, a container or pallet may be loaded with a substance requiring low temperature aging for a certain time. Loading the containers or pallets may take place at a loading station. The containers are then transported to a storage area. After a given time in the storage area, the containers are retrieved, transported to an unloading station and the container unloaded. The container may then be transported to a container storage area. Such functions can be highly automated with the assistance of automated storage and retrieval systems.

In order to conserve floor space, it is desirable to store loads in multilevel systems or in grids in which nearly 100% of available floor space can be utilized. If stored in grids, two load carrying devices are commonly used. A transfer vehicle is commonly used to move loads within storage lanes. To move loads between storage lanes, the transfer vehicle, supporting the load, is moved onto a shuttle vehicle that moves in a direction perpendicular to the transfer vehicle. By utilizing two load carrying devices, any location on the grid can be accessed. Such a grid allows high utilization of floor space.

In a grid system having a multitude of pallets supporting loads, pallets are constantly being moved in order to access pallets that are blocked by other pallets. The constant retrieving, moving, and replacement of pallets can be easily monitored by automated systems that keep track of each discrete pallet's location within the grid. A more difficult problem arises from cumulative placement errors that occur because of the constant pallet movement. Cumulative placement errors eventually can cause a pallet to be placed in a position that could cause a subsequent processing failure because of pallet misplacement. For example, if a tote lid must be removed, the tote must be placed within certain location parameters. If not within those parameters, the lid removal system would unable to grasp or remove the lid.

Another difficulty with such grid systems is that the transfer vehicles have relatively low load carrying capacity. Payloads are now limited to about two tons because of the load raising and lowering ability of the transfer vehicles. Many load raising and lowering systems are cam operated but as load requirements increase, cams become larger thus necessitating larger transfer vehicles which increases grid spacing and overall system cost. As increased loads require larger cams, gearboxes and motors must also increase in power and size because of the minimal mechanical advantage in cam drives. Complex hydraulic systems are more difficult and costly to control, are likely to develop leak problems and are more costly to maintain. It is most desirable to have simple systems that require little maintenance.

What is needed is a system that allows precision automated placement, movement and storage of loads. It is also desirable to have larger weight handling capacity in the transfer vehicle than is currently available. Such systems would allow higher load carrying capacity within the grid system and provide unlimited movement and placement of loads within the system without causing improper placement failures in subsequent processing operations.

Shea, U.S. Pat. No. 1,402,257, shows a freight handling apparatus used to raise and lower freight loads. A plurality of threaded rods were connected by a series of sprockets and chains Although the prior art apparatus solved their specific problems of handling freight, the inventors were not required to address the problem of precision placement or automated load raising and lowering.

SUMMARY OF THE INVENTION

One object of the present invention is to provide means for correct positioning of pallet, totes, or vessels when they are positioned and repositioned in an automated storage and retrieval system.

Another object of the present invention is provide heavy lifting capacity in a simple and compact lift that will have low maintenance requirements.

Yet another object of the invention is to provide an automated transfer system that utilizes a high percentage of the floor area and yet is sufficiently flexible to permit selective retrieval and storage of pallets, totes or vessels.

These and other objects are realized by providing a grid storage system with rails on which a transfer vehicle may be supported. In a grid having multiple storage lanes and multiple locations in each storage lane, a pair of parallel rails extend to form a storage lane.

The cross section of the rails are shaped so as to have a support surface on which a transfer vehicle can be supported. Another portion of the rail cross section, a spacing surface, is fixed to the vehicle support surface, approximately perpendicular to the vehicle support surface and upwardly disposed. Fixed to the spacing surface, parallel to the vehicle support surface and disposed outwardly from the spacing and vehicle support surface is a load support surface. The pallet, tote or vessel comprising the load rests upon the load support surface. The final portion of the rail cross section is an alignment surface extending upwardly and outwardly from the load support surface. The alignment surface is designed so that if a load is not in its correct position, the bottom corner of the load will engage the alignment surface and slide down the alignment surface before the load comes to rest on the load support surface.

In an alternative design, the load support surface may be disposed inwardly from the spacing surface and the alignment surface disposed inwardly from the load support surface. In the alternative arrangement, the alignment surface is designed so that if a load is not in its correct position, the bottom corner of the load's runners engages the alignment surface and slides down the alignment surface before the load comes to rest on the load support surface.

The transfer vehicle comprises a mounting base within which the mechanical components are mounted. The vehicle has a transport system comprising wheels or tracks driven by a positioning motor. Positioning the vehicle is accomplished by external sensors and a feedback system which senses the vehicle location and positions the vehicle in its correct position. A plurality of screw jacks are mounted to the base, linked together by mechanical means, and driven by a lifting motor. The screw jacks are strategically placed, most commonly a jack being placed near each of the four base corners. The jacks can be fastened to either a frame or cover which engages, supports, raises or lowers the load. Alternatively the jacks can directly contact, engage, support, raise or lower the load.

The distancing surface is sized to provide sufficient clearance between the vehicle support surface and load support surface so that when the jacks are retracted there is no contact between the load and transfer vehicle. There also must be sufficient clearance when the jacks are raised that the load moves smoothly above the load support surface.

In many systems, a shuttle vehicle is provided that runs on a pair of tracks disposed perpendicular to the longitudinal axis of the rails. The bed of the shuttle vehicle is fitted with a pair of parallel rails, parallel to the rails that form the storage lanes, onto which the transfer vehicle may move when the shuttle is positioned in the correct storage lane. When the transfer vehicle is resting on the shuttle vehicle rails, the shuttle vehicle can transport the transfer vehicle (and any load the transfer vehicle is supporting) up or down the track to a different storage lane.

BRIEF DESCRIPTION OF THE DRAWINGS

These and other features, aspects, and advantages of the present invention will become better understood with regard to the following description, appended claims, and accompanying drawings where:

DETAILED DESCRIPTION

Although the disclosure herein is detailed and exact to enable those skilled in the art to practice the invention, the physical embodiments herein disclosed merely exemplify the invention which may be embodied in other specific structures. The scope of the invention is defined in the claims appended hereto.

Figure 1:
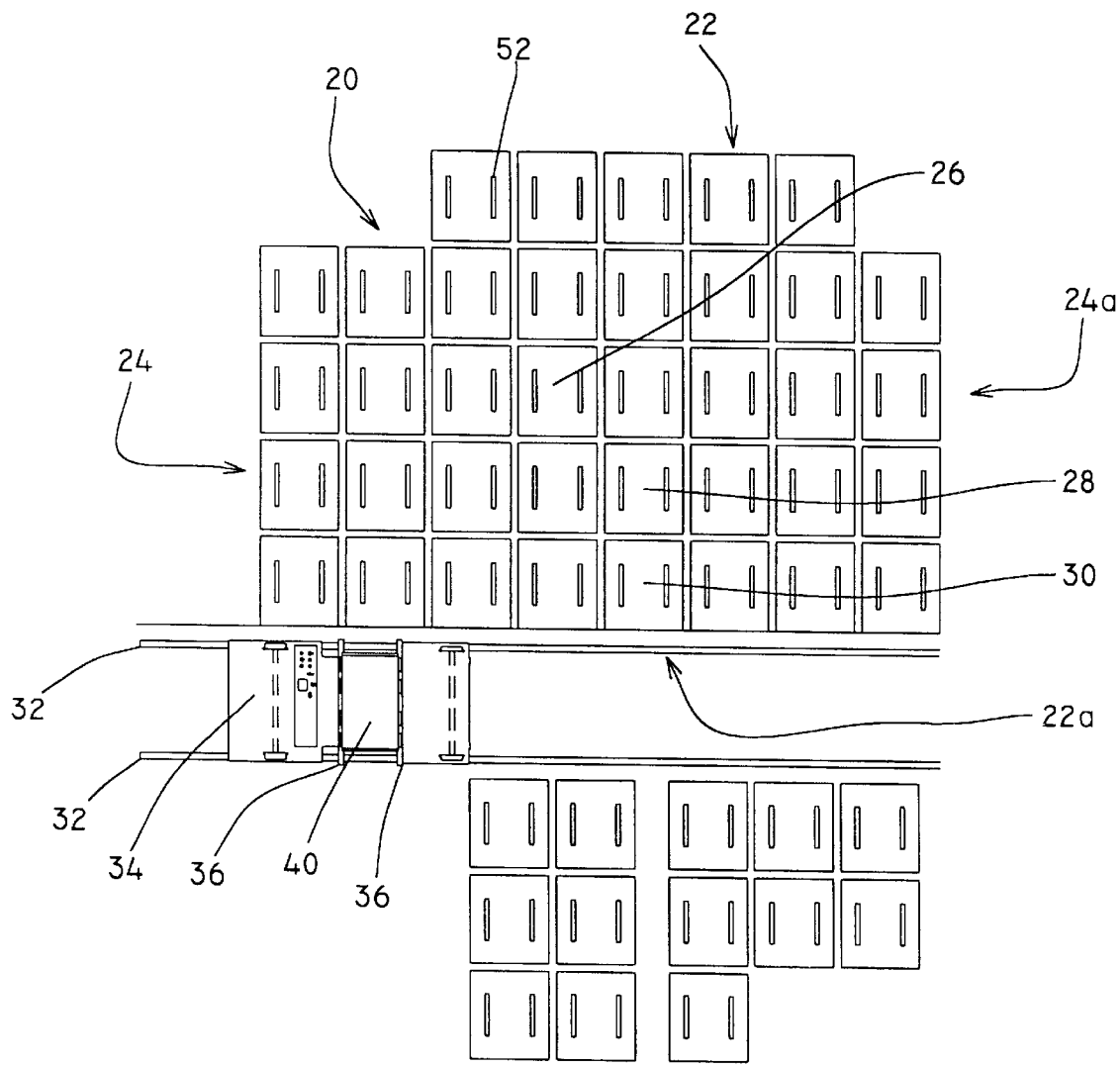
FIG. 1 is a plan view of a storage retrieval grid showing the general layout.

FIG. 1 illustrates the general layout of a portion of a storage and retrieval system of which this invention may a part. The grid storage and retrieval system 20 is comprised of storage lanes 22 and storage rows 24 that form a grid of storage locations. In the grid, the intersection of lane 22a and row 24a defines storage location 26.

Figure 2:
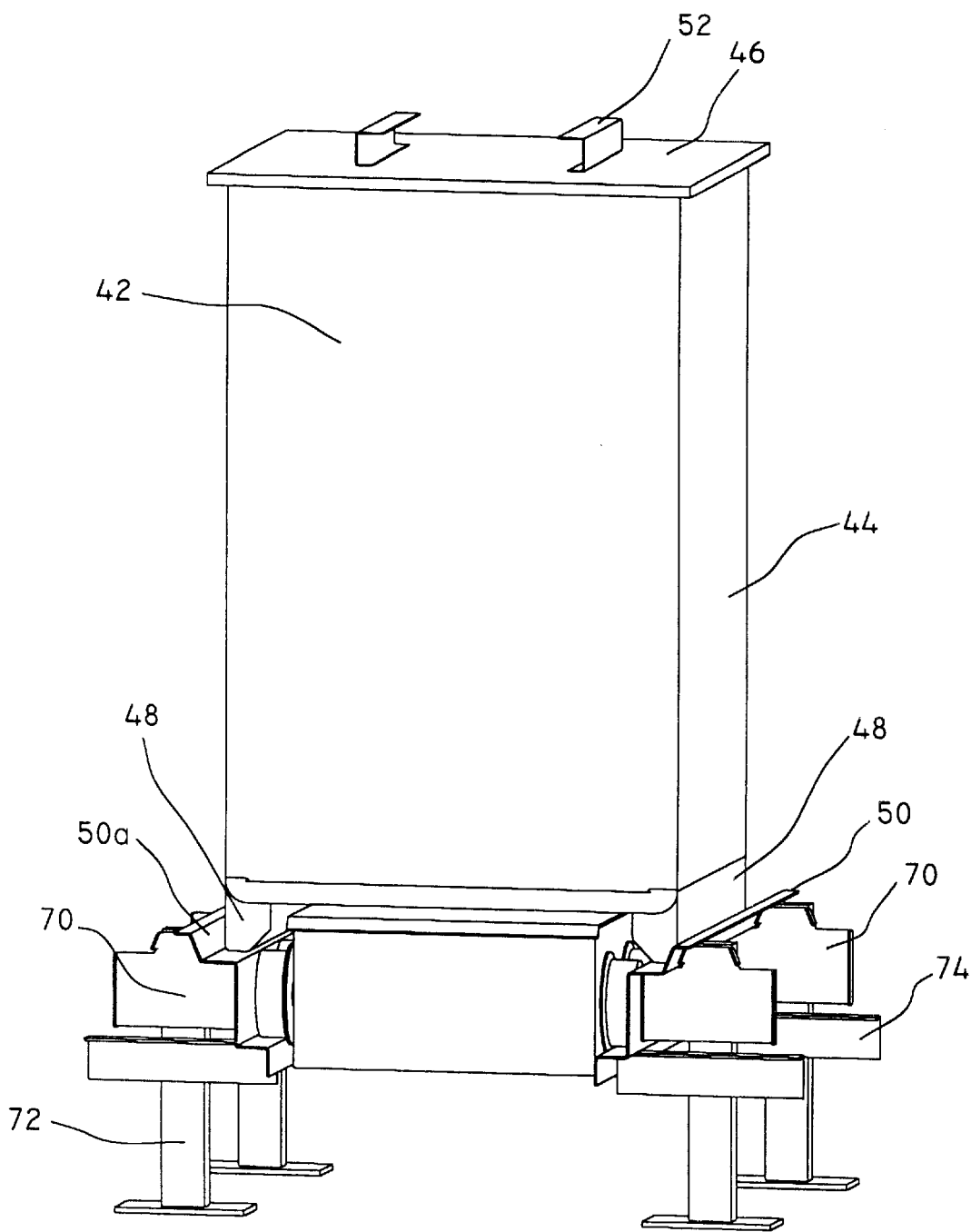
FIG. 2 is a perspective view of my invention showing a tote resting on the rail.

In FIG. 2, the storage item is shown as tote 42, a vessel having sidewalls 44, runners 48, and lid 46 having removal brackets 52. Runners 48 rest on rails 50 and 50a. Removal brackets 52 are also seen in FIG. 1 aligned in each storage lane. Although the system is shown and described using a tote, pallets, vessels or even a flat bottomed skid or load could be utilized with this system.

Figure 3A:
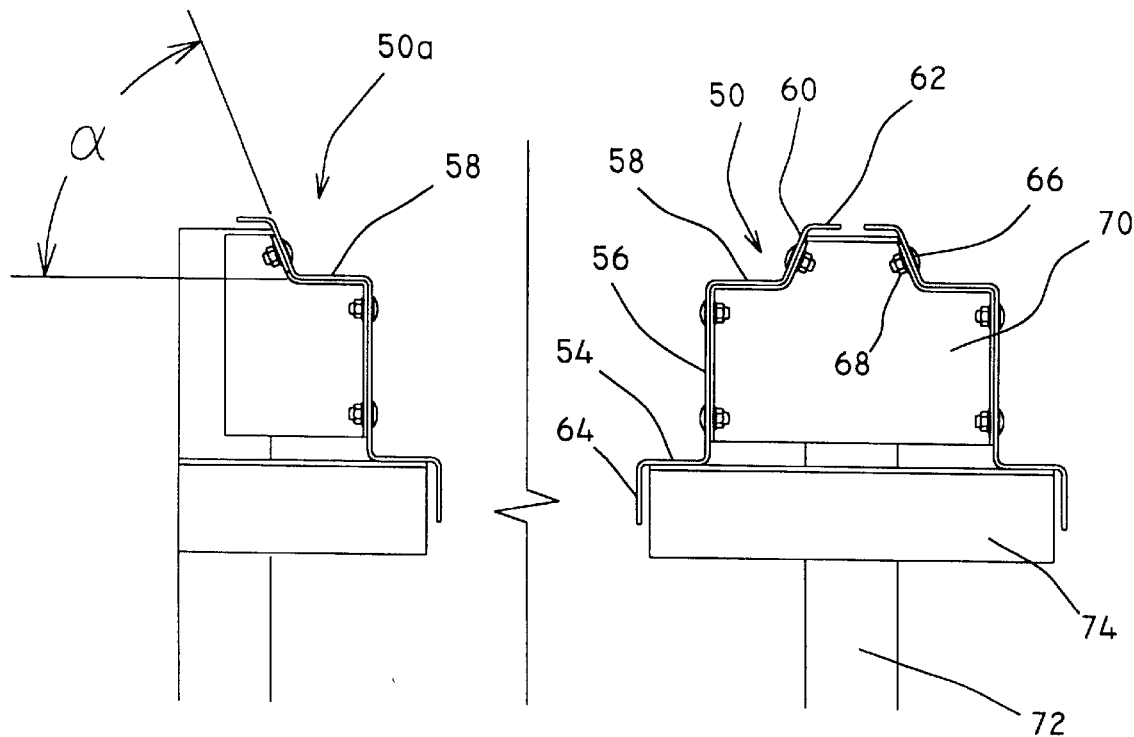
FIG. 3a is a side elevation view of my novel supporting rails.

The rail and support system within the grid is best seen in FIG. 2 and 3a. Tote 42 is supported by rails 50, 50a. Rail 50a is a mirror image of rail 50. FIG. 3a illustrates an endwall installation and best illustrates the cross-sectional configuration of the preferred embodiment of rails 50, 50a. The rails are shaped by bending a sheet or plate into discrete sections that include transfer vehicle support surface 54, spacing surface 56, load support surface 58, alignment surface 60, and shields 62 and 64. The rails are typically constructed of a low carbon cold rolled galvanized plate or sheet steel although other structural systems with sufficient strength to support the load would be suitable.

The rail installation is accomplished by embedding or fastening vertical stanchions 72. Angle bracket 74 is welded, bolted, or otherwise securely fastened horizontally to stanchion 72. Transfer vehicle support surface 54 of rail 50 is supported by angle bracket 74. Also welded, bolted, or otherwise securely fastened to stanchion 72 is rail support clip 70. In the preferred embodiment square holes are punched in rail 50 to serve as location for carriage bolts 66. Bolts 66 pass through mating holes in clip 70 and are securely fastened with nuts 68. Of course this is merely one method of fastening the rails in place. Alternative fastening systems such as welding and other types of bolting and screwing systems may be more appropriate depending on the loads to be carried and the thickens of the members. Rails may also be longitudinally joined using splice plates (not shown) to extend the length of a storage lane beyond the length of a single prefabricated rail.

Figure 4:
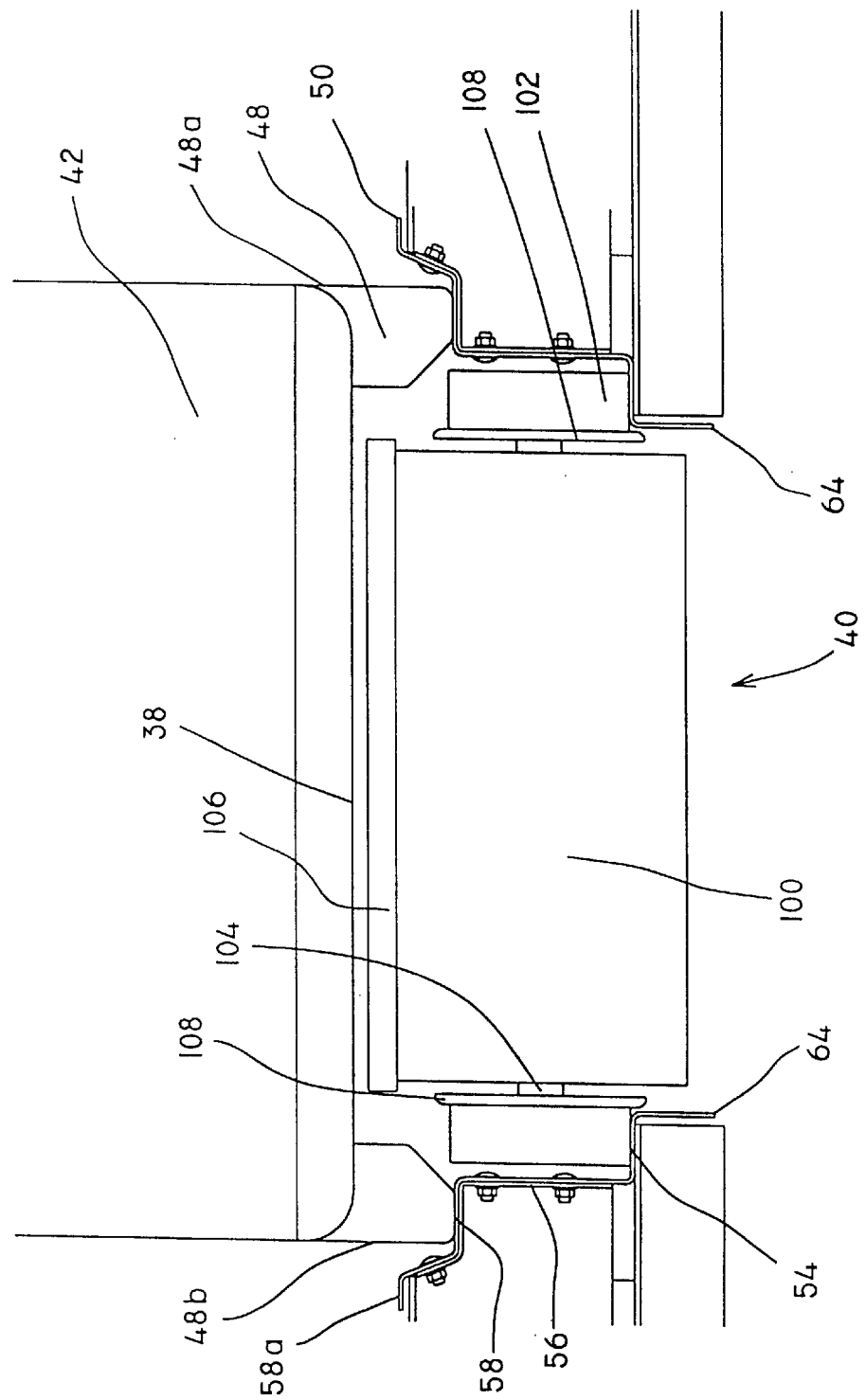
FIG. 4 is a front elevation view of my invention showing my rails, a retracted transfer vehicle and a tote resting upon the load support surface.

Transfer vehicle 40 rides between and is supported by rails 50, 50a as best seen in FIG. 4. In the preferred embodiment, transfer vehicle 40 is suspended by and driven on wheels 102 rotating on axles 104. Flange 108 provides guidance for the wheels as they roll along the rails. Of course transfer vehicles having other suspension and driving methods may also be appropriate. For example, the wheel and axle arrangement could be replaced with a track drive system in which the transfer vehicle track would ride on transfer vehicle support surface 54. In FIG. 4, transfer vehicle top plate 106 is shown in a retracted position leaving sufficient space between top 106 and tote base 38 to allow transfer vehicle 40 to move freely when plate 106 is retracted. Tote 42 is moved by raising plate 106 to engage base 38 which moves runner 48 off load support surface 58. When runner 48 is clear of surface 58, transfer vehicle 40 may move freely on transfer vehicle support surface 54 thus moving the tote back and forth along rails 50, 50a.

Figure 3B:
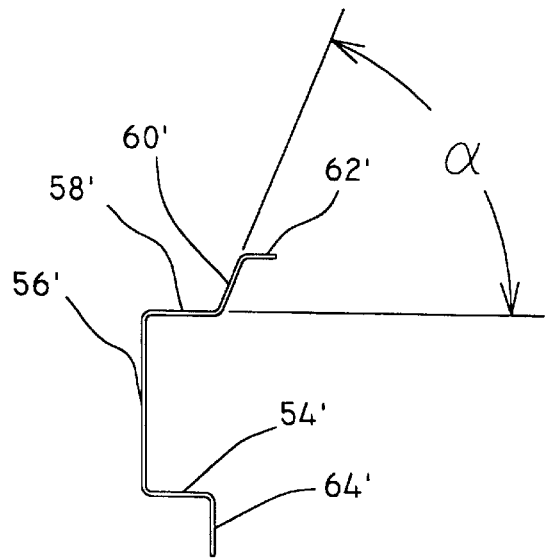
FIG. 3b is a cross sectional view of an alternate embodiment of my supporting rail.

An alternate embodiment of our rail is shown in FIG. 3b. In the alternate embodiment, support surfaces 54' and 58' form a channel closed by spacing surface 56'. Wheel 102 runs on surface 54' and under surface 58' necessitating that wheel 102 be smaller than spacing surface 56'. In this embodiment alignment surface 60' is disposed toward the lane center axis and runners 48 must slide outwardly down surface 60'. Of necessity, this design must be used with a pallet, tote, or skid having runners and flat bottom pallets, totes, and skids cannot be used because of the absence of an inside lip to slide down alignment surface 60'.

With the foregoing information it can be readily seen that precision placement location of the tote depends on clearances between flange 108 and shield 64. Excessive clearance allows the wheels and transfer vehicle to 'wander' between the rails. Insufficient clearance could cause the transfer vehicle to bind between the rails. It has been found that clearances of approximately ¼" to ½" allow the vehicle to move freely with a minimum of wander. Shield 64 also provides the rail section with increased bending strength in the vertical axis.

The width of vehicle support surface 54 and wheel width must be sufficient to ensure that wheel 102 cannot wander off surface 54. Surface 54 must also be wide enough to ensure that the wheels do not bind against spacing surface 56.

The vertical size of spacing surface 56 determined the datum height of load support surface 58. Support surface must be of sufficient height to allow clearance between top plate 106 and base 38 when plate 106 is retracted. In the preferred embodiment, runner 48 raise the level of base 38. In other design situations, runners 48 may be eliminated with base 38 forming a single extended bottom. In such an event, the outboard edges of base 38 would rest on load support surface 58 and it may be necessary to increase the vertical height of spacing surface 56.

FIG. 3 shows the outboard end of surface 58 joined to alignment surface 60 at angle α. The width of surface 58 is determined to be approximately 1" larger than the overall outside dimension across between outside edges 48a, 48b of runners 48. Angle α is sufficiently steep to encourage misaligned runners to slide down alignment surface 60 before coming to rest on surface 58. In actual use, Angle a is kept between 40 and 80 degrees to ensure optimum performance. Shield 62 strengthens the rail in the horizontal axis.

If a misaligned tote is being lowered, the outside edges of runner 38 will contact alignment surface 60. As the tote is lowered, the interaction between runner 38 and surface 60 forces the tote to rotate and/or laterally reposition itself. When fully lowered, runners 38 rest fully on surface 58. The self alignment mechanism is particularly beneficial because cumulative positioning errors are not permitted. Every time the tote is moved, it is replaced within limits set by the outside distance between alignment surfaces 60. Heretofore, there has been no means to prevent the build up of cumulative positioning errors until the totes would be mispositioned to the extent of falling off the transfer vehicle or falling off the rails.

An integral part of the storage and retrieval system is the ability of transfer vehicle 40 to move onto shuttle 34. This is easily accomplished by providing shuttle 34 with a set of rails long enough to accommodate vehicle 40. Shuttle rails 36, seen on FIG. 1, are placed on the top surface of the shuttle at the same height and width as the grid rails. When the shuttle rails and grid rails in a storage lane are, vehicle 40 can move freely between rails 50, 50a in the grid and the rails on the shuttle vehicle. When completely on the shuttle wheel rails, shuttle 34 and vehicle 40 are moved down tracks 32 to another storage lane.

Location 26 is accessed by first moving the items at location 30 and 28 to temporary storage locations. Moving the items at location 30 and 28 is accomplished by moving shuttle 34 along tracks 32 until transfer vehicle 40 is aligned with the lane in which locations 26, 28, and 30 are positioned. The item at location 30 is loaded onto transfer vehicle 40 then moved and placed at an open accessible location on the grid. With location 30 empty, the item at location 28 can be accessed, raised, moved and then placed at another open accessible grid location. Finally, the transfer vehicle can access location 26 and move the item at that location.

Figure 5:
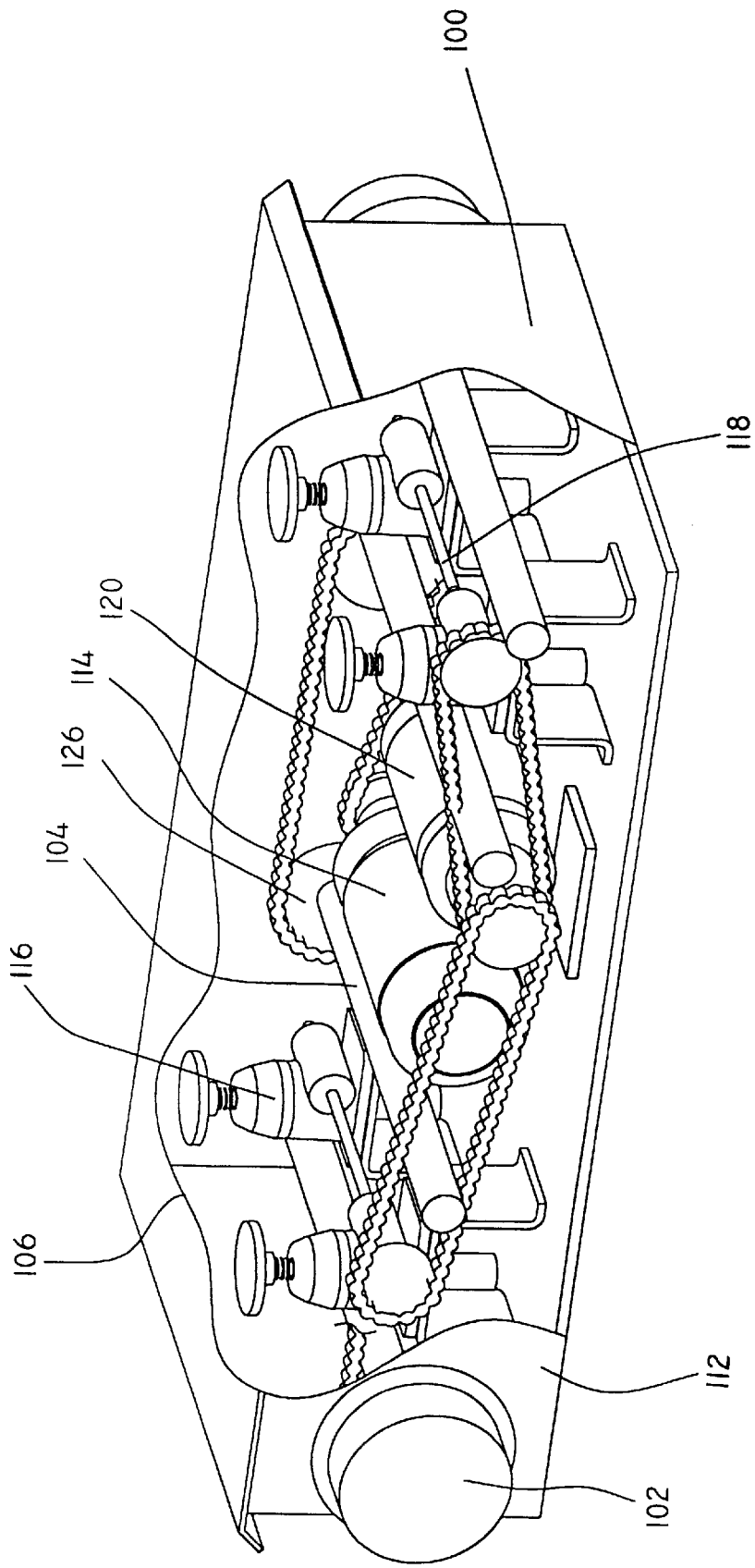
FIG. 5 is a cut away perspective showing the interior components of my transfer vehicle.
Figure 6:
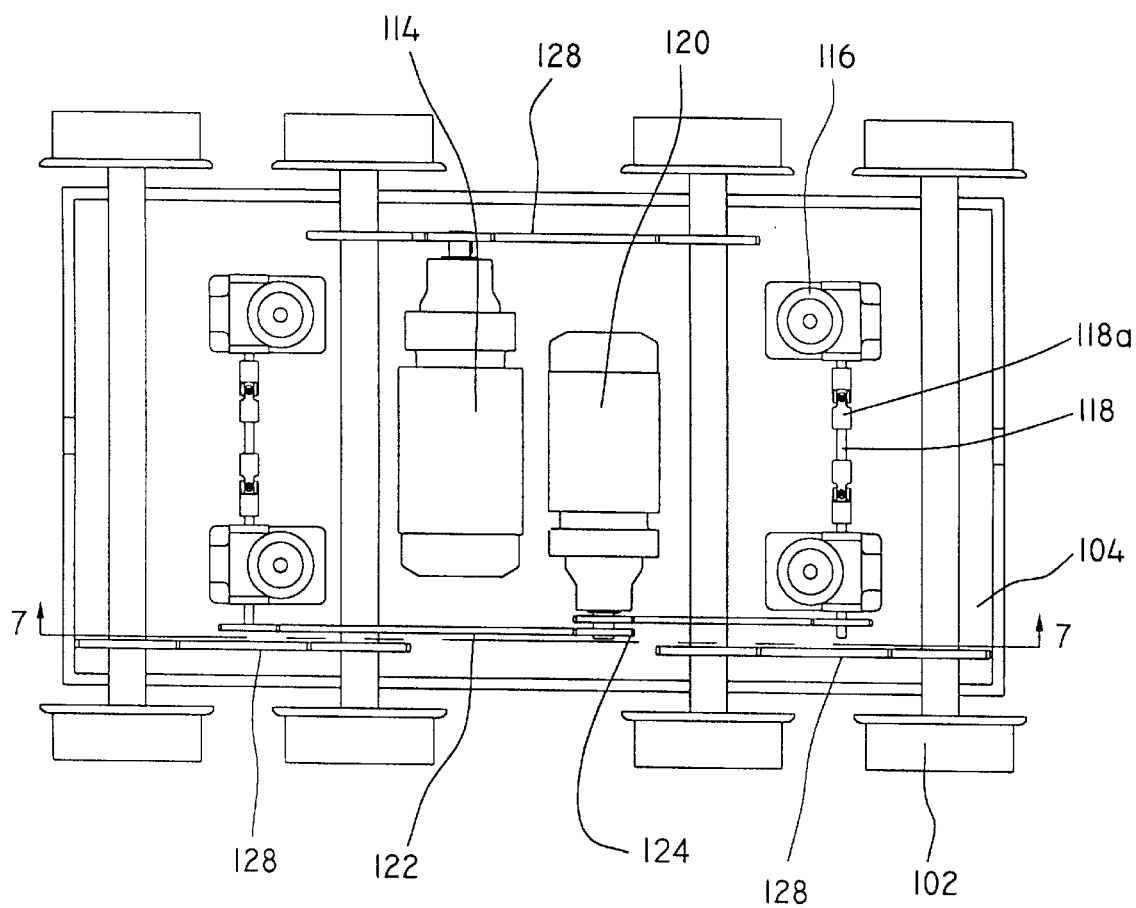
FIG. 6 is an top plan view showing the interior of my transfer vehicle.
Figure 7:
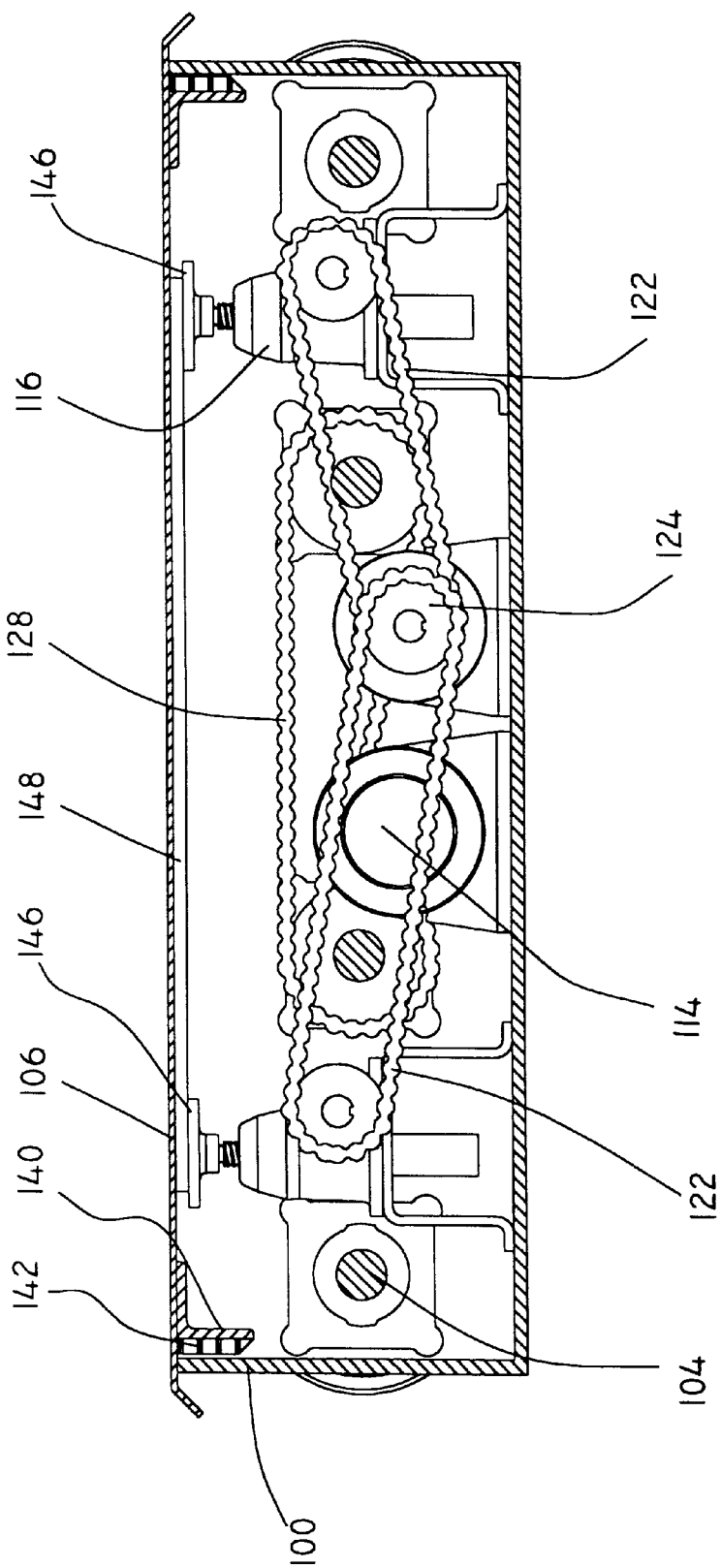
FIG. 7 is a side section view of my new transfer vehicle taken along section 7—7 of FIG. 6.

Internal structure of transfer vehicle is best seen in FIGS. 5–7. In the cutaway view of FIG. 5 and in FIG. 6, wheel drive motor 114 is shown driving wheel axle drive chain 128 which moves around wheel axle drive sprocket 126. Sprocket 126 is securely fastened preferably with a keyway to axle 104. It can readily be seen that rotation of motor 114 causes transfer vehicle 40 to move on wheels 102. Motor 114 is desirably an inverter duty AC gear motor which can quickly and accurately position transfer vehicle at a desired location on rails 50, 50a. D.C. or servo gear motors could also be used to drive and position the transfer vehicle.

The lifting mechanism of transfer vehicle 40 is designed to precisely lift heavy loads. In light duty systems, cam operated lifts could lift and operate within the limited confines of the transfer vehicle. However, lifting heavy loads in a compact space can be accomplished by installing a linked plurality of screw jacks 116. As seen in FIG. 6, jacks 116 are symmetrically positioned in transfer vehicle 40. Linkage is made between pairs of jacks by linkage 118. It have been found desirable to include universal joints 118a in the linkage system but other flexible couplings could be used. Desirably, screw jacks 116 are installed and linked in pairs however this is not a requirement. Suitable connection is made to jack screw motor 120 through sprockets 124 and jack screw drive chain 122. Through the chain drive linkage, jack screw motor 120 is able to precisely raise, lower, and control the rotation of the jacks.

As seen in the cross section of FIG. 7, top plate 106 is supported by jacks 116 through a support system comprised of jack flanges 146 and bar support 148. Flanges 146 and support 148 connect top plate 106 to screw jacks 116 and distribute the total load on jacks 116 without the necessity of an excessively thick and heavy top plate. It is fully contemplated that there may be some designs in which the flange/bar support system and even the top plate could be dispensed with.

At the periphery of plate 106 where the plate abuts endwall 100 and sidewall 112, angle 140 is permanently fastened to the underside of plate 106. In the gap between angle 140 and endwall 100 or sidewall 112 side load guides 142 are replaceably fixed preferably with screws or bolts. The side load guides serve to keep plate 106 in its correct lateral position. The angle taper on guide 142 allow plate 106 to be fully raised to a position even with the top of endwall 100 and sidewall 112 and yet seek a centered position within the constraints of the sidewalls and endwalls as plate 106 is lowered.

Many modifications and variations of the above invention are possible. In particular, mention is made of screws, bolts and other types of threaded fasteners. It is contemplated and within the scope of this invention that when such mention is made that other types of removable fasteners known to a person experienced in the art may be employed. It is therefore understood that the invention may be practiced otherwise than as specifically before described and still fall within the scope of the appended claims.

We claim:

1. A precision placement storage and retrieval system comprising:
   (a) a pair of parallel elongated rails defining a storage lane, each rail being the mirror image of the other, each rail having a wheel support surface, a spacing member, a load support surface having an exterior edge disposed away from said storage lane, and an alignment member, said support surfaces being substantially parallel to each other and fixedly connected to said spacing member so that said spacing member is disposed away from said storage lane and said load support surface is disposed above said wheel support surface, said alignment member being fixedly attached to said exterior edge of said load support surface and extending upwardly at 40–80 degrees from a plane defined by said load support surface;
   (b) a transfer vehicle having a bottom, a transport system comprising a plurality of wheels attached to axles, a drive wheel motor, and a lifting mechanism, said axles and said motor supported by said vehicle bottom, said axles being rotationally controlled by said drive wheel motors, said transfer vehicle being supported by and moveable in said storage lane by the interaction of said wheels and said wheel support surfaces of said rails; and
   (c) load supporting apparatus having a plurality of flat bottomed runners, said runners being sized to fit on said load support surfaces between said alignment members so that if said runners contact said alignment members, said runners slide down said alignment members until said runners rest on said load support surfaces.

2. The precision placement storage and retrieval system of claim 1 in which said lifting mechanism further comprises a jack control motor and a plurality of screw jacks having screws, said motor and said screw jacks being attached to said bottom of said transfer vehicle, said screw jacks being linked together and driven with said jack control motor so that the elevation of said screws is controllable with said jack control motor.

3. The precision placement storage and retrieval system of claim 2 further comprising a lid on said transfer vehicle, said lid being supported by said screw jacks.

4. The precision placement storage and retrieval system of claim 1 further comprising an elongated shield having an edge, the edge being fixedly attached to said alignment surface, said shield being substantially parallel to said load support surface and extending away from said spacing member.

5. The precision placement storage and retrieval system of claim 4, further comprising an elongated second shield having an edge, said edge being fixedly attached to said wheel support surface and downwardly disposed.

6. In a storage and retrieval system, an elongated rail system comprising a pair of rails defining a storage lane, each rail comprising:
   (a) an elongated wheel support surface defining a plane, said wheel support surface having a first edge and a second edge;
   (b) an elongated spacing member defining a second plane, said spacing member fixedly attached to the second edge of said wheel support surface and disposed perpendicular to said wheel support surface so that said spacing member is disposed away from said storage lane;
   (c) an elongated load support surface having a first edge and a second edge, said elongated load support surface defining a plane substantially parallel to and spaced apart from said wheel support surface, the first edge of said lload support surface being fixedly attached to said spacing member so that said load support member is disposed toward said storage lane;
   (d) an elongated alignment surface having a first edge and a second edge, the first edge of said elongated alignment surface fixedly attached to said second edge of said second elongated support surface, the second edge of said alignment surface being disposed angularly between 40 and 80 degrees from a plane defined by said elongated second support surface in a direction toward said storage lane; and
   (e) an elongated shield having an edge, the edge being fixedly attached to said second edge of said alignment surface, said shield being substantially parallel to said load support surface and extending toward said storage lane.

7. The rail of claim 6 further having an elongated second shield having an edge, said edge being fixedly attached to the first edge of said wheel support surface and disposed on a plane substantially parallel to that of said spacing member in a direction away from that of said load support surface.

8. The elongated rail system of claim 7, further comprising a transfer vehicle having a bottom, transport means comprising a plurality of wheels attached to axles and a drive motor, said axles and said motor supported by said vehicle bottom, said axles being rotationally controlled by said drive motor with said transfer vehicle supported by and moveable in the storage lane by the interaction of said wheels and said wheel support surfaces of said rails.

9. The elongated rail system of claim 8 in which said lifting mechanism further comprises a jack control motor and a plurality of screw jacks having screws, said motor and said screw jacks being attached to said bottom of said transfer vehicle, said screw jacks being linked together and driven with said jack control motor so that the elevation of said screws is controllable with said jack control motor.

10. The elongated rail system of claim 9, further comprising storage means having a plurality of runners, said runners being sized to fit on said load support surfaces outside of said alignment members so that if said runners contact said alignment members, said runners slide down said alignment members until said runners rest on said load support surfaces.

11. The elongated rail system of claim 6, further comprising a transfer vehicle having a bottom, transport means comprising a plurality of wheels attached to axles and a drive motor, said axles and said motor supported by said vehicle bottom, said axles being rotationally controlled by said drive motor with said transfer vehicle supported by and moveable in the storage lane by the interaction of said wheels and said wheel support surfaces of said rails.

12. The elongated rail system of claim 11 in which said lifting mechanism further comprises a jack control motor and a plurality of screw jacks having screws, said motor and said screw jacks being attached to said bottom of said transfer vehicle, said screw jacks being linked together and driven with said jack control motor so that the elevation of said screws is controllable with said jack control motor.

13. The elongated rail system of claim 12, further comprising storage means having a plurality of runners, said runners being sized and shaped to fit on said load support surfaces so that if said runners contact said alignment members, said runners slide down said alignment members until said runners rest on said load support surfaces.

14. In a storage and retrieval system, an elongated rail system comprising a pair of rails defining a storage lane, one of said rails being on either side of said storage lane, each rail comprising:

(a) an elongated wheel support member having a first edge and a second edge, said first edge being disposed toward said storage lane;

(b) an elongated spacing member having a first edge and a second edge, said first edge of said spacing member fixedly attached to said second edge of said wheel support member, said spacing member being upwardly disposed;

(c) an elongated load support member having a first edge and a second edge, said first edge of said load support member being fixedly attached to said second edge of said spacing member and disposed outwardly from said storage lane so that said load support member defines a plane substantially parallel to said wheel support member;

(d) an elongated alignment member having a first edge and a second edge, said first edge being fixedly attached to said second edge of said load support member and disposed upwardly and away from said storage lane so that said alignment member extends upwardly at an angle between 40 to 80 degrees from said plane of said load supporting member; and (e) an elongated shield having a first edge and a second edge, said first edge being fixedly attached to said second edge of said alignment member so that said elongated shield is disposed away from said storage lane and defines a plane substantially parallel to said load support surface.

15. The elongated rail system of claim 14 further comprising a second elongated shield having a first edge and a second edge, said first edge being fixedly attached to said first edge of said wheel support member and downwardly disposed.

16. The elongated rail system of claim 15, further comprising a transfer vehicle having a bottom, transport means comprising a plurality of wheels attached to axles and a drive motor, said axles and said motor supported by said vehicle bottom, said axles being rotationally controlled by said drive motor with said transfer vehicle supported by and moveable in the storage lane by the interaction of said wheels and said wheel support surfaces of said rails.

17. The elongated rail system of claim 16 in which said lifting mechanism further comprises a jack control motor and a plurality of screw jacks having screws, said motor and said screw jacks being attached to said bottom of said transfer vehicle, said screw jacks being linked together and driven with said jack control motor so that the elevation of said screws is controllable with said jack control motor.

18. The elongated rail system of claim 17, further comprising storage means having a plurality of runners, said runners being sized to fit on said load support surfaces inside of said alignment members so that if said runners contact said alignment members, said runners slide inwardly down said alignment members until said runners rest on said load support surfaces.

19. The elongated rail system of claim 14, further comprising a transfer vehicle having a bottom, transport means comprising a plurality of wheels attached to axles and a drive motor, said axles and said motor supported by said vehicle bottom, said axles being rotationally controlled by said drive motor with said transfer vehicle supported by and moveable in the storage lane by the interaction of said wheels and said wheel support surfaces of said rails.

20. The elongated rail system of claim 19 in which said lifting mechanism further comprises a jack control motor and a plurality of screw jacks having screws, said motor and said screw jacks being attached to said bottom of said transfer vehicle, said screw jacks being linked together and driven with said jack control motor so that the elevation of said screws is controllable with said jack control motor.

21. The elongated rail system of claim 20, further comprising storage means having a plurality of runners, said runners being sized to fit on said load support surfaces outside of said alignment members so that if said runners contact said alignment members, said runners slide down said alignment members until said runners rest on said load support surfaces.

* * * * *